(12) United States Patent
Martin et al.

(10) Patent No.: US 11,076,327 B2
(45) Date of Patent: Jul. 27, 2021

(54) TELECOMMUNICATIONS APPARATUS AND METHODS FOR TRIGGERING HANDOVER EVALUATION PROCEDURE

(71) Applicant: Sony Corporation, Tokyo (JP)

(72) Inventors: Brian Alexander Martin, Basingstoke (GB); Shin Horng Wong, Basingstoke (GB); Martin Warwick Beale, Basingstoke (GB); Yuxin Wei, Basingstoke (GB); Hideji Wakabayashi, Basingstoke (GB); Chrysovalantis Kosta, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 16/323,534

(22) PCT Filed: Jul. 14, 2017

(86) PCT No.: PCT/EP2017/067875
§ 371 (c)(1),
(2) Date: Feb. 6, 2019

(87) PCT Pub. No.: WO2018/028937
PCT Pub. Date: Feb. 15, 2018

(65) Prior Publication Data
US 2019/0174374 A1 Jun. 6, 2019

(30) Foreign Application Priority Data
Aug. 11, 2016 (EP) ..................... 16183702

(51) Int. Cl.
*H04W 36/00* (2009.01)
*H04W 36/32* (2009.01)
(Continued)

(52) U.S. Cl.
CPC ..... *H04W 36/00837* (2018.08); *H04L 5/0048* (2013.01); *H04W 36/0088* (2013.01);
(Continued)

(58) Field of Classification Search
CPC ....... H04W 36/00837; H04W 36/0085; H04W 36/0088; H04W 88/085; H04L 5/0048
See application file for complete search history.

(56) References Cited

U.S. PATENT DOCUMENTS

2010/0323633 A1  12/2010  Pani et al.
2019/0319686 A1* 10/2019  Chen, IV ............ H04W 72/046

FOREIGN PATENT DOCUMENTS

EP     2209340 A1    7/2010
EP     2879448 A1    6/2015
(Continued)

OTHER PUBLICATIONS

CATT, Introduction of Virtual Cell, 3GPP TSGRAN WG2 Meeting #93bis, R2-162571, Apr. 11-15, 2016 (Year: 2016).*
(Continued)

*Primary Examiner* — Kent Krueger
(74) *Attorney, Agent, or Firm* — Xsensus LLP

(57) ABSTRACT

A method for triggering an aspect of a handover evaluation procedure in a wireless telecommunications system for determining whether to handover a terminal device from communicating with a first network infrastructure element associated with a first communication cell to communicating with a second network infrastructure element associated with a second communication cell.

12 Claims, 7 Drawing Sheets

(51) Int. Cl.
  *H04L 5/00* (2006.01)
  *H04W 36/18* (2009.01)
  *H04W 36/30* (2009.01)
  *H04W 88/08* (2009.01)

(52) U.S. Cl.
  CPC ............ *H04W 36/18* (2013.01); *H04W 36/30* (2013.01); *H04W 36/32* (2013.01); *H04W 36/0085* (2018.08); *H04W 88/085* (2013.01)

(56) References Cited

FOREIGN PATENT DOCUMENTS

| WO | 97/33388 A1 | 9/1997 |
|---|---|---|
| WO | 97/44969 A2 | 11/1997 |
| WO | 2016/206998 A1 | 12/2016 |
| WO | 2017/198394 A1 | 11/2017 |

OTHER PUBLICATIONS

Holma et al., "LTE for UMTS OFDMA and SC-FDMA based radio access", John Wiley and Sons, 2009, 11 pages.
Ericsson, "Mobility based on DL and UL measurements", 3GPP TSG-RAN WG2 Meeting No. 94 Tdoc R2-163999, Nanjing China May 23-27, 2016, 3 pages.
Huawei, Hisilicon, "Considerations on New Radio Operation for Ultra Dense Networks", 3GPP TSG RAN WG1 Meeting No. 84bis R1-162164, Busan Korea, Apr. 11-15, 2016, 7 pages.
Samsung, "Beam level management <-> Cell level mobility", 3GPP TSG-RAN WG2 Meeting No. 93bis R2-162210, Dubrovnik Croatia, Apr. 11-15, 2016, 4 pages.
Samsung, Nokia Networks, "New SID Proposal: Study on channel model for frequency spectrum above 6 GHz", 3GPP TSG RAN Meeting No. 68 RP-150781, Malmö, Sweden, Jun. 15-18, 2015, 6 pages.
CMCC, "New Study Item Proposal: Study on Scenarios and Requirements for Next Generation Access Technologies", 3GPP TSG RAN Meeting No. 68 RP-150813, Malmö, Sweden, Jun. 15-18, 2015, 5 pages.
Samsung, Nokia Networks, Qualcomm, Intel, "New SID Proposal: Study on Next Generation New Radio Access Technology", 3GPP TSG RAN Meeting No. 69 RP-151551, Phoenix USA, Sep. 14-16, 2015, 6 pages.
Samsung, Nokia Networks, "New SID Proposal: Study on channel model for frequency spectrum above 6 GHz", 3GPP TSG RAN Meeting No. 69 RP-151606, Phoenix USA, Sep. 14-16, 2015, 6 pages.
NTT Docomo, "New SID Proposal: Study on New Radio Access Technology", 3GPP TSG RAN Meeting No. 71 RP-160671, Göteborg Sweden, Mar. 7-10, 2016, 8 pages.
ITU-R, "IMT Vision—Framework and overall objectives of the future development of IMT for 2020 and beyond", Recommendation ITU-R M.2083-0, Sep. 2015, 21 pages.
Dino Flore, "RAN workshop on 5G: Chairman Summary", Chairman of 3GPP RAN, Sep. 2015, pp. 1-12.
Flore et al., ""5G" timeline in 3GPP", 3GPP TSG RAN Meeting No. 67, Shanghai China, SP-150140, Mar. 9-12, 2015, pp. 1-24.
3GPP, "5G; Study on Scenarios and Requirements for Next Generation Access Technologies", 3GPP TR 38.913 version 14.2.0 Release 14, May 2017, 41 pages.
International Search Report dated Oct. 13, 2017 for PCT/EP2017/067875 filed on Jul. 14, 2017, 13 pages.

* cited by examiner

TELECOMMUNICATIONS APPARATUS AND METHODS FOR TRIGGERING HANDOVER EVALUATION PROCEDURE

CROSS-REFERENCE TO RELATED APPLICATIONS

The present application is based on PCT filing PCT/EP2017/067875, filed Jul. 14, 2017, and claims priority to 16183702.6, filed in the European Patent Office on Aug. 11, 2016, the entire contents of each of which being incorporated herein by reference.

BACKGROUND

Field

The present disclosure relates to telecommunications apparatus and methods, and in particular to methods and apparatus for controlling handover procedures in wireless telecommunications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices having different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G network). One particular area where new approaches may be helpful is in relation to handovers between network nodes responsible for communicating with a terminal device, which may be referred to as mobility management. It will be appreciated handovers may result from a device physically moving between coverage areas of different cells or from changing radio conditions associated with different cells for a static device, and the term mobility management may be used for both scenarios.

With current mobile telecommunications systems, such as those based on the 3GPP defined UMTS and Long Term Evolution (LTE) based architectures, handover procedures are carried out on the basis of measurements of downlink signals broadcast by each of the network nodes. These measurements are performed by terminal devices and network node selection, reselection or handover is then performed on the basis of these measurements so as to allow each terminal device to communicate with the network.

Existing approaches for handling mobility, with the associated measurement report signalling, handover signalling and evaluation procedures, however, results in relatively high power consumption by a terminal device and require terminal devices to comprise relatively complex equipment for performing such measurements over a range of different radio frequencies. This results in lower terminal device battery life. In addition, existing handover procedures require a relatively large number of messages to be exchanged, which results in a relatively high control signalling overhead and increased chance of handover failure, particularly in the case of small cells and/or fast moving terminal devices, because of the time taken to perform the measurements and signalling.

In view of these drawbacks there is a desire to provide for new approaches for handling mobility in wireless telecommunications systems which in some cases can help to address some of these issues.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
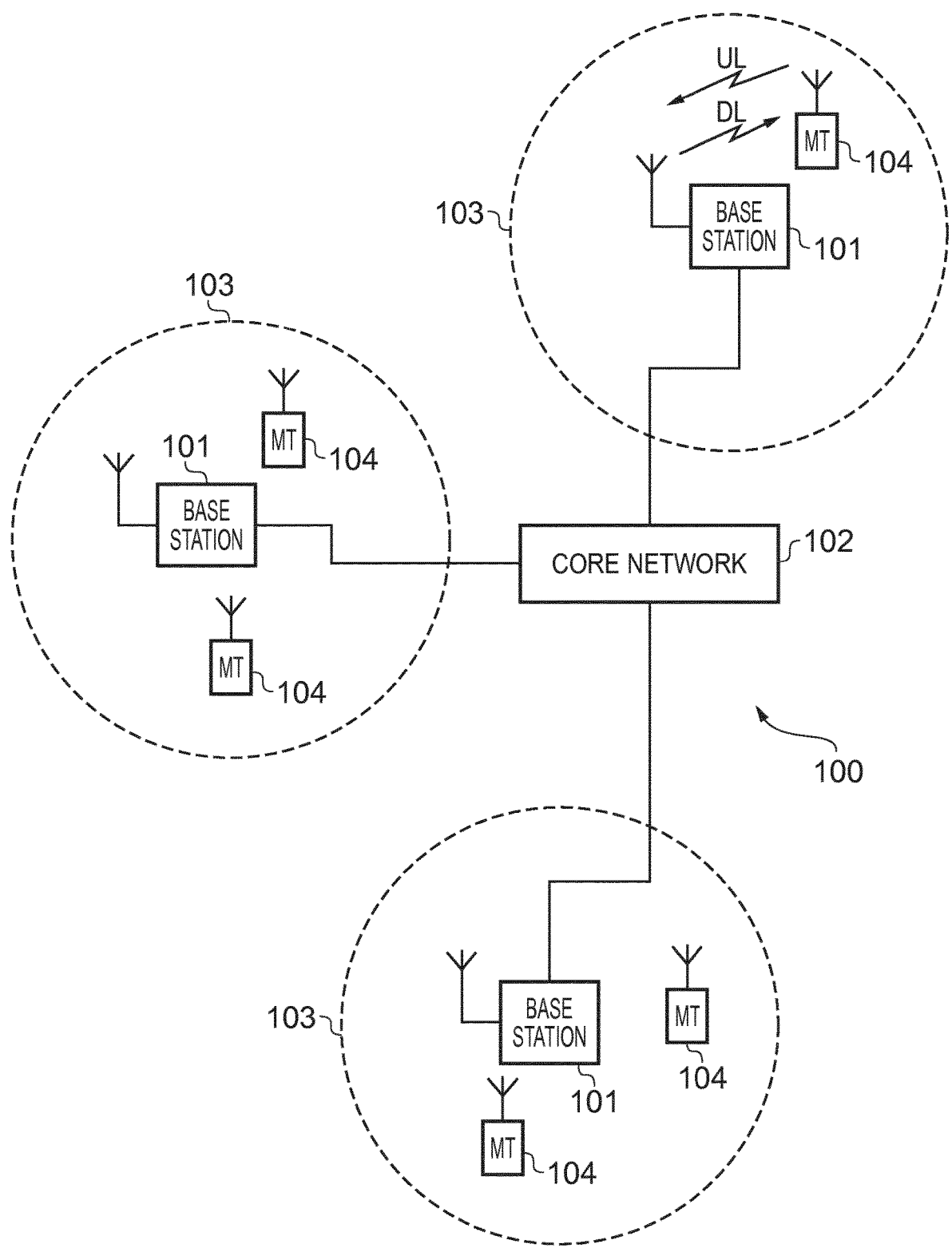
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP (®) body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
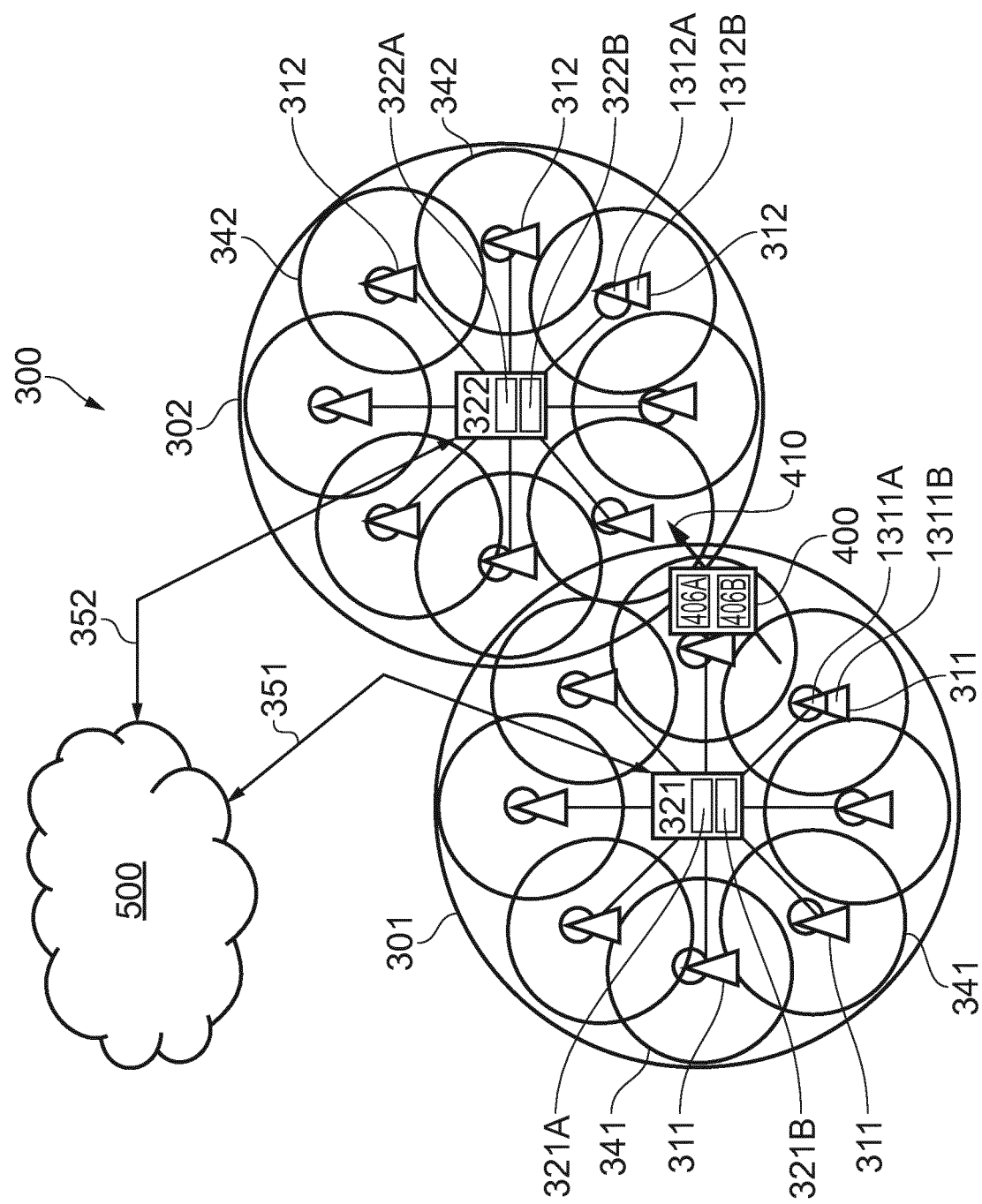
FIG. 2 schematically represents some elements of a wireless telecommunications network/system in accordance with certain embodiments of the disclosure.

FIG. 2 is a schematic diagram illustrating a network architecture for a new RAT wireless mobile telecommunications network/system 300 based on previously proposed approaches and which may be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 500 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 500 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. For simplicity the present description assumes communications for a given terminal device are routed through one of the distributed units, but it will be appreciated in some implementations communications associated with a given terminal device may be routed through more than one distributed unit, for example in a soft handover scenario and other scenarios. That is to say, references herein to communications being routed through one of the distributed units should be interpreted as references to communications being routed through one or more of the distributed units. In this regard, the particular distributed units through which a terminal device is currently connected through to the associated controlling node may be referred to as active distributed units for the terminal device. The active subset of distributed units for a terminal device may comprise one or more than one distributed units (TRPs). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units including communications from the terminal device to a controlling node is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein for handling mobility/handovers in a wireless telecommunications system may also be applied in respect of wireless telecommunications systems having different architectures. That is to say, the specific wireless telecommunications architecture for a wireless telecommunications system adapted to implement functionality in accordance with the principles described herein is not significant to the principles underlying the described approaches.

The terminal device 400 comprises a transceiver unit 400A for transmission and reception of wireless signals and a processor unit 400B configured to control the terminal device 400. The processor unit 400B may comprise various sub-units for providing functionality in accordance with embodiments of the present disclosure as explained further herein. These sub-units may be implemented as discrete hardware elements or as appropriately configured functions of the processor unit. Thus the processor unit 400B may comprise a processor unit which is suitably configured/programmed to provide the desired functionality described herein using conventional programming/configuration techniques for equipment in wireless telecommunications systems. The transceiver unit 400A and the processor unit 400B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 400 will in general comprise various other elements associated with its operating functionality, for example a power source, user interface, and so forth, but these are not shown in FIG. 2 in the interests of simplicity.

The first and second controlling nodes 321, 322 in this example are functionally identical but serve different geographical areas (cells 301, 302). Each controlling node 321, 322 comprises a transceiver unit 321A, 322A for transmission and reception of communications between the respective controlling nodes 321, 322 and distributed units 311, 312 within their respective communication cells 301, 302 (these communications may be wired or wireless). Each controlling node 321, 322 further comprises a processor unit 321B, 322B configured to control the controlling node 321, 322 to operate in accordance with embodiments of the present disclosure as described herein. The respective processor units 321B, 322B may again comprise various sub-units for providing functionality in accordance with embodiments of the present disclosure as explained herein. These sub-units may be implemented as discrete hardware elements or as appropriately configured functions of the processor unit. Thus, the respective processor units 321B, 322B may comprise a processor unit which is suitably configured/programmed to provide the desired functionality described herein using conventional programming/configuration techniques for equipment in wireless telecommunications systems. The respective transceiver units 321A, 322A and processor units 321B, 322B for each controlling node 321, 322 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the controlling nodes 321, 322 will in general comprise various other elements, for example a power supply, associated with their operating functionality.

The respective distributed units (TRPs) 311, 312 in this example are functionally identical but serve different parts of their respective cells. That is to say, the distributed units are spatially distributed through their respective communication cells to support communications for terminal devices at different locations within the cells, as schematically indicated in FIG. 2. Each distributed unit 311, 312 comprises a transceiver unit 1311A, 1312A for transmission and reception of communications between the respective distributed units 311, 312 and their associated controlling node 321, 322 and also for transmission and reception of wireless radio communications between the respective distributed units 311, 312 and any terminal device they are currently supporting. Each distributed unit 311, 312 further comprises a processor unit 1311B, 1312B configured to control the operation of the distributed unit 311, 312 in accordance with the principles described herein. The respective processor units 1311B, 1312B of the distributed units may again comprise various sub-units. These sub-units may be implemented as discrete hardware elements or as appropriately configured functions of the processor unit. Thus, the respective processor units 1311B, 1312B may comprise a processor unit which is suitably configured/programmed to provide the desired functionality described herein using conventional programming/configuration techniques for equipment in wireless telecommunications systems. The respective transceiver units 1311A, 1312A and processor units 1311B, 1312B are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/circuitry. It will be appreciated the distributed units 311, 312 will in general comprise various other elements, for example a power supply, associated with their operating functionality.

As discussed above, with conventional telecommunications systems, mobility management is performed on the basis of measurements by a terminal device of downlink signals broadcast by radio network access points (i.e. base stations in an LTE context). In the example telecommunications system 300 of FIG. 2, rather than the terminal device 400 performing measurements on downlink signalling transmitted by radio access nodes for the network, the terminal device 400 instead transmits reference signalling which can be measured by radio access nodes (distributed units/TRPs) in the communication cell associated with the controlling node to which the terminal devices is currently connected. Based on these measurements, the controlling node for the communication cell may determine which of the (one or more) distributed units/radio network access nodes is most appropriate for supporting communications between the controlling node and the terminal device (i.e. which TRP should be active for the terminal device), and configure their operation accordingly. The specific manner in which the controlling nodes are configured to route communications through the desired distributed unit(s) for a given terminal device is not significant to the principles described herein.

Thus, the radio/channel conditions associated with a communication path between a terminal device and respective ones of the distributed units in a communication cell in which the terminal device 400 is operating may be determined based on measurements of a characteristic of uplink reference signalling transmitted by the terminal device and received by the respective ones of the distributed units. There are a number of different characteristics of uplink reference signalling that may be measured to determine an indication of radio channel conditions associated with a radio path between the terminal device and each respective radio network access nodes/distributed units receiving the reference signalling in the communication cell in which the terminal device is operating. For example, the measured characteristic may be an indication of the received signal strength or quality of the reference signalling, and the controlling node 321 may control the radio access node reporting the highest signal strength or quality of the reference signalling to be the serving node for the terminal device. As a more specific example, the signal strength or quality of a known sequence of reference symbols of the reference signalling could be the measured characteristic. Furthermore, the controlling node may also take other information into account in addition to the indications of the relevant reference signal characteristic measurements received from the various radio network access nodes in the selection of the serving node, for example load balancing.

In accordance with certain embodiments of the disclosure, in addition to using references signalling from the terminal device to help a controlling node determine which is the most appropriate distributed unit/radio access point through which to route communications to and from a terminal device operating within the controlling node's communication cell, uplink reference signalling may also be used to support handover procedures in the wireless telecommunications system 300.

As discussed above, the terminal device 400 represented in FIG. 2 is communicating with the controlling node 321 of communication cell 301 via one of the distributed units 311 selected by the controlling node based on measurements of uplink reference signalling from the terminal device 400 by respective ones of the distributed units 311. However, it is assumed here the terminal device is moving in the direction indicated by the arrow 410 so that it is in the process of moving out of coverage of the first communication cell 301, and into coverage of the second communication cell 302 associated with the second controlling node 322. Accordingly, the terminal device 400 should be handed over from the first controlling node 321 associated with the first communication cell 301 to the second controlling node 322 associated with the second communication cell 302.

Figure 3:
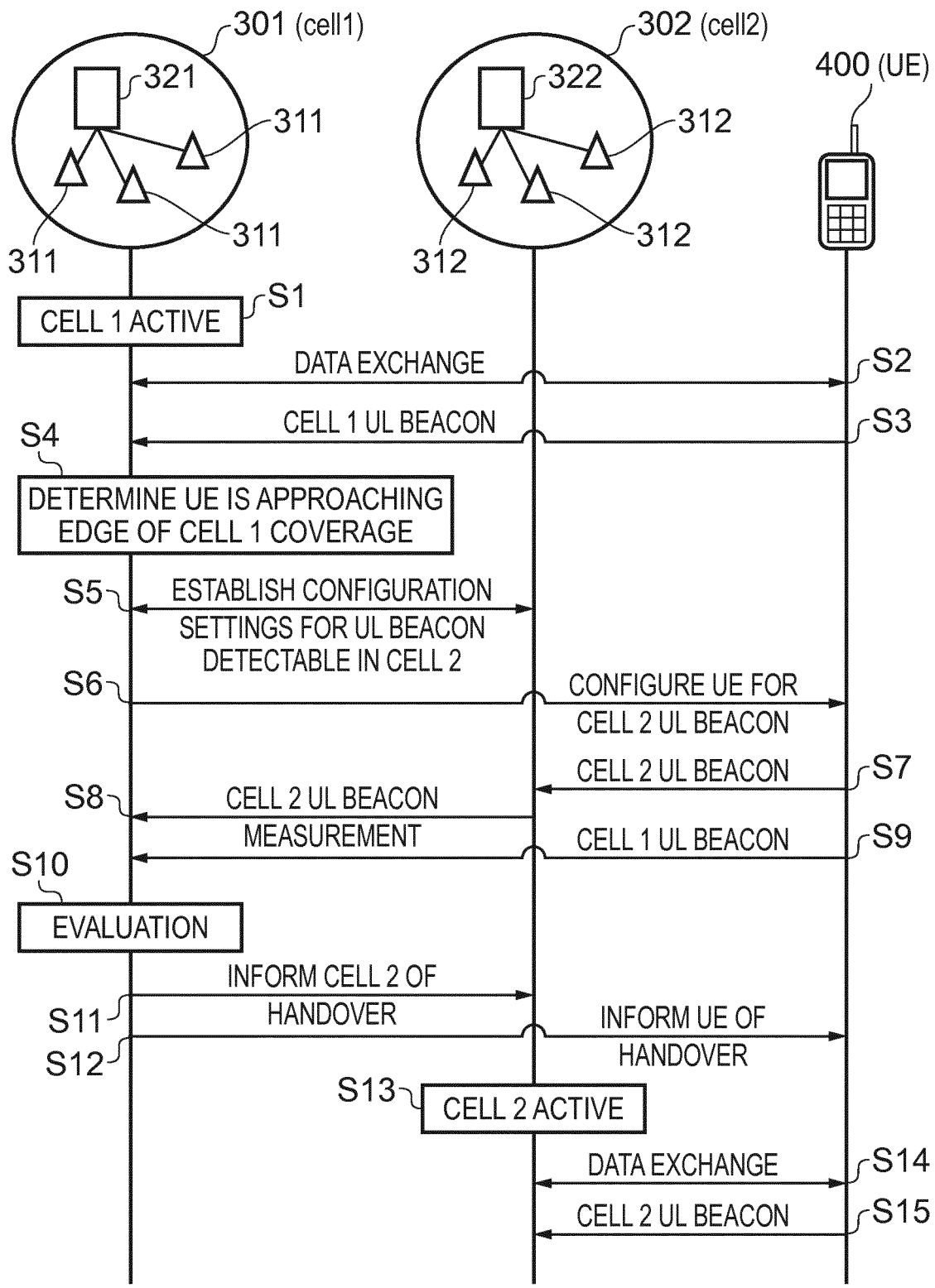
FIGS. 3 and 4 are ladder diagrams schematically representing some operating aspect of wireless telecommunications networks/systems in accordance with certain embodiments of the disclosure.

FIG. 3 is a ladder diagram schematically representing some operating aspects of the wireless telecommunications system 300 of FIG. 2 operating in accordance with certain embodiments of the disclosure. In particular, the diagram represents operations and signalling exchange associated with the terminal device 400, the elements representing the first communication cell 301 (i.e. the controlling node 321 and its connected radio access nodes 311) and elements representing the second communication cell 302 (i.e. the controlling node 322 and its connected radio access nodes 312). The first communication cell 301 may sometimes be referred to herein as cell 1 and the second communication cell 302 may sometimes be referred to as cell 2.

The processing represented in FIG. 3 starts in step S1 in which it is assumed the terminal device 400 is active on cell 1 (i.e. the terminal device is within the coverage area of cell 1 and connected to the first controller unit 321), which is the situation schematically represented in FIG. 2.

As schematically represented in step S2, when the terminal device is active on cell 1 it may exchange data with the network via the controlling node 321. This exchange of data may comprise uplink and downlink transmissions of user plane data and control plane data supporting the operation of the terminal device within the first communication cell 301. This aspect of the operation may be performed in accordance with any proposed techniques for exchanging data in a wireless telecommunications network of the kind represented in FIG. 2. It will be appreciated the specific nature and content of the data exchanged in step S2 is not significant to the principles described herein.

As noted above, the wireless telecommunications network of FIG. 2 is assumed to be based on one of the proposed new RAT network architectures in which a cell comprises a controlling network infrastructure element (i.e. the control unit 321 in cell 1) and a group of radio network access nodes (i.e. the distributed units 311). The radio network access nodes provide a wireless access interface for the terminal device and are each communicatively coupled to their controlling network infrastructure element. The specific radio network access node supporting the terminal device 400 may be determined by the controlling network infrastructure element in accordance with any previously proposed technique, for example based on uplink reference/beacon signalling transmitted by the terminal device and received by various ones of the radio network access nodes. It may be expected that the presence of the radio access nodes within the communication path between the terminal device 400 and the controlling network infrastructure element will be transparent to the terminal device 400. That is to say, in this example implementation the terminal device is not aware, and does not take account of, the presence of the radio access nodes in its operations (although as noted above, in other implementations the terminal device may be aware of the distributed unit(s) being used). For simplicity of representation the radio access nodes 311 and the controlling infrastructure element 321 are schematically grouped together as a single node in the ladder diagram of FIG. 3 (in effect the left-hand node of FIG. 3 simply corresponds with the communication cell 301), it being appreciated that within this node communications will be routed to the controlling infrastructure element 321 via currently active ones of the distributed units. Similarly, the radio access nodes 312 associated with the second controlling network infrastructure element 322 are schematically grouped together as a single node in the ladder diagram of FIG. 3 (so that in effect the middle node of FIG. 3 corresponds with the communication cell 302).

As schematically indicated in step S3, while the terminal device 400 is active on cell 1 it is configured to transmit uplink reference signalling/reference signals, to allow for measurements of radio conditions associated with a communication path between the terminal device 400 and the first network infrastructure element 321. As noted above, a characteristic of the reference signalling received by the various radio access nodes 311 in the first communication cell 301 may be communicated back to the controlling network infrastructure element 321 to allow the controlling network infrastructure element 321 to determine which of the radio access nodes 311 should be active in supporting radio communications for the terminal device. For example, the radio access node(s) associated with the best measurements of the uplink reference signalling, for example in terms of said power or received quality, may be selected as the radio access node(s) through which communications with the terminal device are routed. More generally, it will be appreciated the specific algorithm applied to determine which radio access node(s) to use is not significant to the principles described herein. It will further be appreciated the specific characteristics of the uplink reference signalling/beacon signalling are also not significant to the principles described herein. What is relevant in this example implementation is that the signalling allows the controlling network infrastructure element 321 for the first communication cell 301 in which the terminal device 400 is operating to establish an indication of a measurement of radio conditions associated with a communication path between the terminal device and the controlling network infrastructure element 321. The uplink reference signalling of step S3 may, for example, be transmitted in accordance with a predefined repeating schedule to allow the first network infrastructure element 321 to monitor radio conditions associated with its communications with the terminal device on an ongoing basis.

In step S4 it is assumed the first network infrastructure equipment 321 determines that the terminal device 400 is approaching the edge of the coverage area provided by cell 1. This determination may be used as a trigger to initiate a handover evaluation procedure (or at least initiate an aspect of a handover evaluation procedure) for determining whether to handover the terminal device from communicating with the first network infrastructure element associated with the first communication cell to communicating with the second network infrastructure element associated with the second communication cell. There are various ways in which the first network infrastructure equipment may determine the terminal device is approaching the edge of the coverage area provided by cell 1 (i.e. there may be various sub-steps within step S4), and some examples in accordance with certain embodiments of the disclosure are set out below, for example with reference to FIGS. 5 to 7.

In step S5, in response to the determination in step S4 that the terminal device 400 is near the edge of the first communication cell, the first network infrastructure element communicates with the second network infrastructure element 322, for example via their respective links to the core network element 500, to establish a configuration setting which the terminal device 400 should use for its beacon/uplink reference signalling to be detected within cell 2. That is to say, the first and second network infrastructure elements communicate with one another so the first network infrastructure element can establish an appropriate configuration setting to be used by the terminal device 400 to allow for a measurement of radio conditions associated with a communication path between the terminal device and the second network infrastructure element in the second communication cell. For example, cell 1 may be operating in a first frequency band, while cell 2 may be operating in a different second frequency band. In this case the configuration setting may include information relating to the frequency on which the terminal device should transmit reference signalling to be received in cell 2.

More generally, a configuration setting for the measurement of radio conditions associated with a communication path between the terminal device and the second network infrastructure element may comprise one or more of: an indication of whether the measurement for the second cell is to be made in respect of uplink signalling or downlink signalling; an indication of one or more frequencies to be used for the measurement; an indication of a timing to be used for the measurement, for example a specific timeslot in which to transmit reference signalling, or synchronisation information for communications in the second communication cell; an indication of an identifier to be used by the terminal device in association with the measurement, for example a radio network temporary identifier (RNTI) or a specific code to allow the network infrastructure element 322 in the second communication cell 302 to identify reference signalling from the terminal device 400; an indication of a radio access technology to be used for the measurement, for example in case the different communication cells operate in accordance with different radio access technologies, and an indication of reference signalling to be used for the measurement, for example an indication of one or more signature sequences used for the reference signalling.

In step S6 the first network infrastructure equipment 321 communicates to the terminal device 400 an indication of the configuration setting to be used by the terminal device for uplink reference signalling to be detected within cell 2.

In response to this, as schematically indicated in step S7, the terminal device 400 transmits an uplink reference in accordance with the configuration settings received in step S6. This uplink reference signalling is received by respective ones of the radio network access nodes 312 in the second communication cell 302. The radio access nodes 312 receiving the reference signalling make appropriate measurements (e.g. by measuring the power and/or quality of the reference signalling) and forward these measurements to the controlling network infrastructure element 322 associated with the second communication cell 302. It will be appreciated the uplink reference signalling transmitted in step S7 for the second communication cell 302 corresponds closely with the uplink reference signalling transmitted in step S3 for the first communication cell 301, except for being transmitted with a different configuration setting in accordance with the configuration setting information received from the first network infrastructure equipment in step S6.

As schematically indicated in step S8, the network infrastructure element 322 in the second communication cell 302 forwards an indication of the uplink reference measurements made on cell 2 to the first network infrastructure element 301 (or to a core network element). In practice the second network infrastructure element 322 in the second communication cell 302 may be configured to simply transmit to the first network infrastructure element 321 in the first communication cell 301 an indication of the best measurement of the uplink reference signalling made by the different radio network access nodes 312 operating in the second communication cell 302 which received the uplink reference signalling in step S7.

As schematically indicated in step S9, the terminal device 400 in this example is shown to retransmit reference signalling on cell 1. The transmission may correspond with one of the regular repeating transmissions of the signalling represented in step S3, for example.

In step S10 the first network infrastructure element 321 in the first communication cell 301 evaluates whether or not the terminal device 400 should be handed over to the second communication cell 302. This evaluation is based on a comparison of radio channel conditions associated with the different cells based on measurements of uplink reference signalling from the terminal device in the different cells. For example, if the measurement of the uplink reference signalling transmitted in step S7 indicates there is a communication path between the terminal device 400 and the second network infrastructure elements 322 which is associated with better radio conditions than a communication path between the terminal device 400 and the first network infrastructure equipment 321, as determined from measurements of the uplink reference signalling on cell 1 in step S9 (or an earlier measurement, such as in step S3), the first network infrastructure element 321 may determine to handover communications with the terminal device from the first cell to the second cell. In general it will be appreciated this specific step in the process represented in FIG. 3 may be performed generally in accordance with conventional techniques for establishing when to initiate a handover based on a comparison of radio channel measurements.

In this example it is assumed in step S10 the first network infrastructure element 321 determines that it is appropriate to handover the terminal device to the second communication cell. Accordingly, in step S11 the first network infrastructure element 321 informs the second network infrastructure element 322 of the handover. This may, for example, involve the communication of information, for example context information for the terminal device 400, which will assist the second communication cell in taking over communications with the terminal device 400 from the first communication cell, and it may include requesting a configuration from the second infrastructure element to be transmitted to the terminal device from the first infrastructure equipment in the handover command.

In step S12, the first network infrastructure element informs the terminal device of the handover, and this may involve the communication of information to allow the terminal device to configure itself to communicate with the second communication cell. The configuration information conveyed to the terminal device in step S12 may, for example, comprise at least one of: an indication of system information associated with the second network infrastructure element; an indication of one or more frequencies to be used for communicating with the second network infrastructure element; an indication of a timing, e.g. a synchronisation offset, associated with the second network infrastructure element/second communication cell 302; an indication of an identifier to be used by the terminal device for communicating with the second network infrastructure element (for example a radio network temporary identifier, RNTI); a random access configuration, a radio resource control, RRC, configuration (including for example, radio bearer configurations with physical channels, transport channels, logical channels, and measurement configurations to be enabled after handover) to be used for communicating with the second network infrastructure element; and an indication of a radio access technology to be used for communicating with the second network infrastructure element. Although not represented in FIG. 3, the first network infrastructure equipment 321 associated with the first communication cell 301 may obtain this information from the second network infrastructure equipment 322 associated with the second communication cell, for example in association with the signalling exchanged in step S5, or subsequent signalling exchange.

Thus, step S12 represents the end of the handover procedure represented in FIG. 3, and the terminal device 400 is now active on cell 2, as schematically indicated by step S13. Subsequently, the terminal device may exchange data with the second communication cell (represented in step S14) and transmit uplink reference signalling to the second communication cell (represented in step S15) in a corresponding manner to that discussed above with reference to steps S2 and S3 for the communications with the first communication cell 301.

Thus, FIG. 3 represents a handover procedure in accordance with some embodiments of the disclosure. An aspect of this procedure is that it allows a terminal device to be handed over from one communication cell to another communication cell when the different cells rely on different configuration settings for their respective channel condition measurements. This is achieved by having the first communication cell 301 establish a configuration setting to be used by the terminal device for a measurement of radio conditions associated with communications in a second communication cell, thereby allowing measurements of radio channel conditions to be made on both communication cells and a comparison of the measurements to be used for determining whether to handover the terminal device from one communication cell to the other.

It will be appreciated that the processing represented in FIG. 3 is merely one example, and different implementations may adopt different processing. For example, in other implementations the steps represented in FIG. 3 may be performed in a different order, and some steps may be omitted. For example, in some implementations there may be no step corresponding to step S9, and instead the evaluation in step S10 may be based on a measurement made in respect of previous uplink reference signalling, for example transmitted in step S3. In another implementation the terminal device may not require reconfiguring to transmit a beacon signal which is appropriate for detection in the second cell 302 and may instead transmit a single signal that may be used for establishing measurements of radio conditions in both the first cell 301 and the second cell 302. In such a case, there will be no need for steps corresponding to steps S5 and S6, and steps S7 and S9 may in effect be combined into one step of transmitting beacon signalling that is detectable in both the first cell and the second cell, the second cell then providing an indication of its measurement to the first cell in a step corresponding to step S8. In such an implementation the first controlling node 321 in the first cell 301 may be configured to provide the second controlling node 322 in the second cell 302 with configuration information to allow the terminal device's uplink beacon signalling to be received in the second cell (e.g. at a stage corresponding to step S5 in FIG. 3). That is to say, when it is determined the terminal device 400 is at the boundary between the first communication cell and the second communication cell (in step S4), the network infrastructure equipment in the first communication cell 301 may provide the network infrastructure equipment in the second communication cell 302 with an indication of the relevant characteristics of the uplink beacon signalling from the terminal device 400 to allow the signalling to be detected in the second communication cell. This is in contrast to the approach represented in FIG. 3 in which the network infrastructure equipment in the first communication cell 301 provides the terminal device with an indication of the relevant characteristics of the uplink beacon signalling to use to allow the network infrastructure equipment in the second communication cell 302 to receive its uplink beacon signalling.

It will also be appreciated that whereas the example represented in FIG. 3 is based on two communication cells in which radio channel conditions are measured based on uplink reference signalling, similar principles may be used in scenarios in which one or other of the communication cells relies on a downlink signalling for radio channel condition measurements. For example, in some implementations a terminal device may be able to operate in both a new RAT communication cell and a conventional LTE-based communication cell. In this case radio condition measurements in the new RAT communication cell may be based on uplink reference signalling while radio condition measurements in the conventional LTE-based communication cell may be based on downlink reference signalling. In another implementation, both communication cells might operate in accordance with a new RAT, but one might simply be configured to undertake radio channel measurements based on downlink signalling with the other configured to undertake radio channel measurements based on uplink signalling. In either case, and regardless of whether the first communication cell (source communication cell) and the second communication cell (target communication cell) in a potential handover scenario rely on uplink or downlink reference signalling for measurements of radio conditions, the same principles in terms of having one communication cell provide a terminal device with configuration information to allow radio channel conditions to be measured in respect of a different communication cell can be applied.

Figure 4:
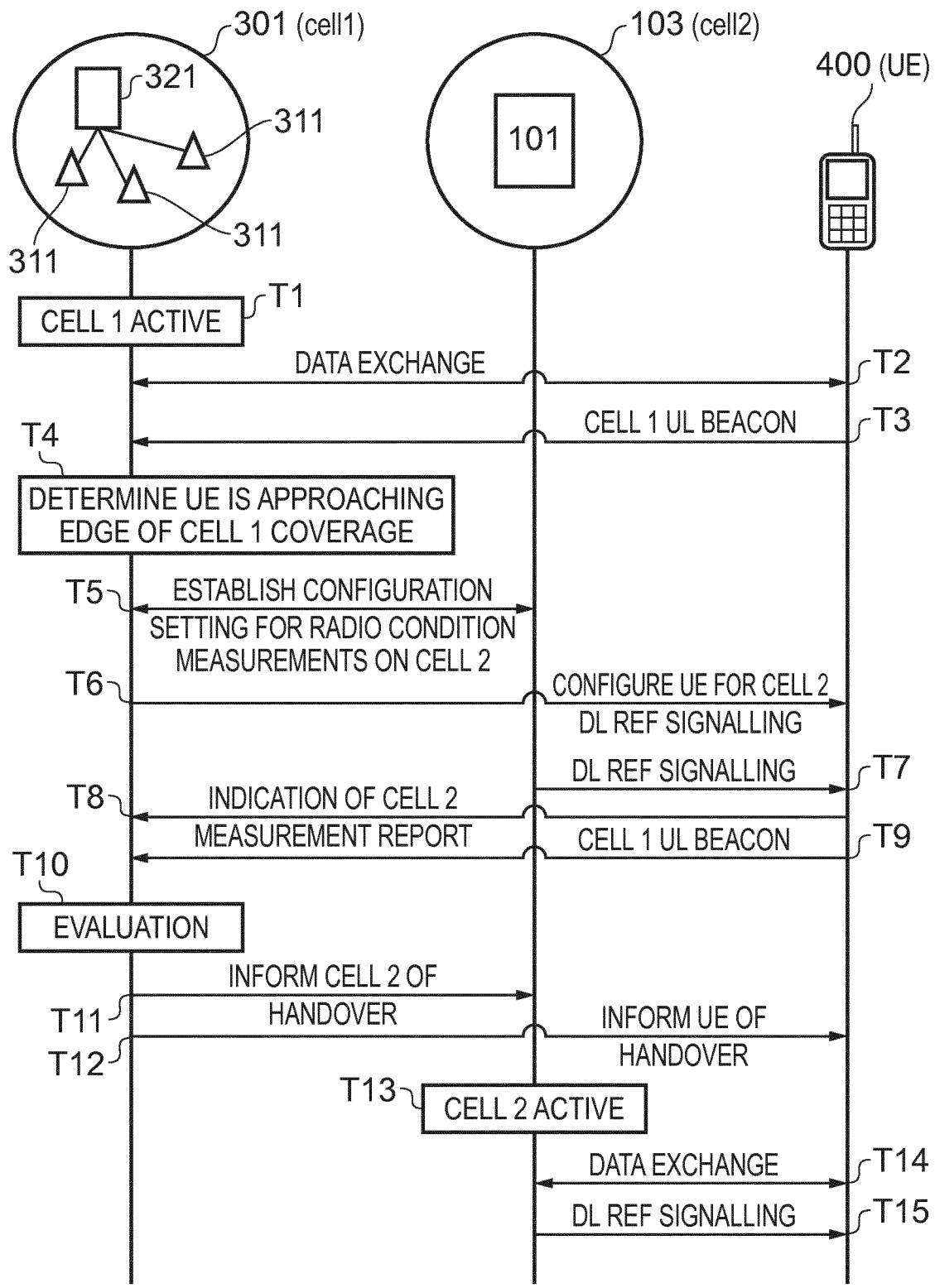

FIG. 4 is a diagram which is similar to, and will be understood from, FIG. 3, but shows a scenario in which a terminal device which is initially operating in the first communication cell 301 represented in FIG. 2 moves into the coverage area, and so is handed off to, a conventional LTE communication cell 103 of the kind represented in FIG. 1.

Steps T1, T2, T3 and T4 in FIG. 4 are similar to, and will be understood from, the corresponding steps S1, S2, S3 and S4 in FIG. 3.

In step T5, in response to the determination in step T4 that the terminal device 400 is approaching the edge of the first communication cell, the first network infrastructure element communicates with the base station 101 in the second communication cell 103 to establish a configuration setting which the terminal device 400 should use to detect downlink reference signalling transmitted by the base station 101 in accordance with the conventional downlink reference signalling based approaches for establishing radio channel condition measurements in LTE-based networks. The first network infrastructure equipment may obtain configuration setting information from the base station 101 via their respective links to a core network, or the first network infrastructure equipment 321 may simply determine the relevant information from system information transmitted by the base station 101.

In step T6 the first network infrastructure equipment 321 communicates to the terminal device 400 an indication of the configuration setting to be used by the terminal device for receiving downlink reference signalling, and making corresponding channel condition measurements, in respect of transmissions from the base station 101.

Although not shown in the example of FIG. 4, in some other implementations, the first network infrastructure equipment may instruct/trigger the second network infrastructure equipment to make transmissions to facilitate the terminal device's measurement of a characteristic of radio conditions associated with a communication path between the second network infrastructure equipment and the terminal device. For example, the second network infrastructure equipment may be triggered to begin transmitting downlink reference signalling to be measured by the terminal device. This may be useful, for example, in a situation in which the second cell is not associated with a conventional LTE cell (which typically broadcasts reference signalling on a continuous basis), but is based on a different radio access technology, such as UTRAN, GERAN, WLAN or a 5G new RAT, which might not involve the transmission of downlink reference signalling on a continuous basis. In some cases the second network infrastructure equipment may be triggered to begin transmitting other information, for example any system information that is required by the terminal device to make the measurement.

In response to this, as schematically indicated in step T7, the terminal device 400 configures itself to receive downlink reference signalling from the base station 101 of communication cell 2 in accordance with the configuration settings received in step S6. This downlink reference signalling may be received by the terminal device 400 in accordance with conventional LTE techniques, and be used by the terminal device to establish a measurement of radio conditions between the base station 101 and the terminal device 400, again in accordance with conventional LTE techniques.

Having made a measurement of the radio channel conditions between the base station 101 and the terminal device 400 using the reference signalling received in step T7, the terminal device proceeds to transmit a corresponding measurement report to the first network infrastructure element 321 in the first communication cell, as schematically indicated in step T8. The content and format of the measurement report may correspond with the conventional content and format of an LTE-based measurement report or it may correspond to a new measurement report format which may contain measurements of neighbouring cells of a new RAT for LTE or any other RAT. In another implementation the terminal device may send a measurement report to the base station which then forwards an indication of the relevant information to the first network infrastructure element in the first cell 301.

As schematically indicated in step T9, the terminal device 400 in this example is shown to retransmit uplink reference signalling on cell 1. The transmission may correspond with one of the regular repeating transmissions of the signalling represented in step T3, for example.

In step T10 the first network infrastructure element 321 in the first communication cell 301 evaluates whether or not the terminal device 400 should be handed over to the second communication cell 103. This evaluation is based on a comparison of radio channel conditions associated with the different cells based on the measurements of uplink reference signalling received from the terminal device in step T9 and the measurement report indicating radio channel conditions between the base station 101 and the terminal device 400 received from the terminal device in step T8. This evaluation may again be performed having regard to the conventional principles for determining when a handover is appropriate having regard to radio channel condition measurements associated with different communications cells.

In this example it is assumed in step T10 the first network infrastructure element 321 determines that it is appropriate to handover the terminal device to the second communication cell. Accordingly, in step T11 the first network infrastructure element 321 informs the base station 101 of the handover. This signalling may correspond with conventional handover signalling in an LTE-based wireless telecommunications system.

In step T12, the first network infrastructure element informs the terminal device of the handover, and this may again be performed generally in accordance with conventional principles for handover signalling in an LTE based wireless telecommunications system.

Thus, step T12 represents the end of the handover procedure represented in FIG. 4, and the terminal device 400 is now active on cell 2, as schematically indicated by step T13. Subsequently, the terminal device may exchange data with the second communication cell (represented in step T14) and continue to receive downlink reference signalling for channel measurement reporting on the second communication cell (represented in step T15) in accordance with conventional procedures for operating a terminal device in an LTE-based wireless telecommunications system.

Thus, FIG. 4 represents a handover procedure in accordance with embodiments of the disclosure where an initially active communication cell relies on uplink signalling for establishing radio conditions and a target communication cell relies on downlink signalling for establishing radio conditions. Again, a significant aspect of this procedure is that it allows a terminal device to be handed over from one communication cell to another communication cell where the cells rely on different configuration settings for their respective channel condition measurements. This is again achieved by having the first communication cell 301 establish a configuration setting to be used by the terminal device for a measurement of radio conditions associated with communications in a second communication cell, thereby allowing measurements of radio channel conditions to be made on both communication cells and a comparison to be used for determining whether to handover the terminal device from one communication cell to the other.

As noted above there are various ways in which network infrastructure equipment may determine a terminal device is approaching the edge of its coverage area and some examples in accordance with certain embodiments of the disclosure are now described with reference to FIGS. 5 to 7. In broad summary, certain embodiments of the disclosure provide approaches for triggering part of a handover evaluation procedure for determining whether to handover a terminal device from communicating with a first network infrastructure element associated with a first communication cell to communicating with a second network infrastructure element associated with a second communication cell. The approaches are in effect based on determining which intermediate node(s) are currently active for the terminal device, and if the active node(s) correspond with one or more predefined active nodes serving a boundary region of the first cell, it may be determined the terminal device is in the vicinity of the boundary region/edge of the first cell, and as such an aspect of a handover evaluation procedure should be initiated. In this regard, initiating part of a handover evaluation procedure may correspond with initiating a new handover evaluation procedure or modifying an aspect of an ongoing handover evaluation procedure, for example increasing the rate of transmission/reception of reference signalling used to evaluate whether or not to handover when it is determined the terminal device is approaching the edge of the cell.

Figure 5:
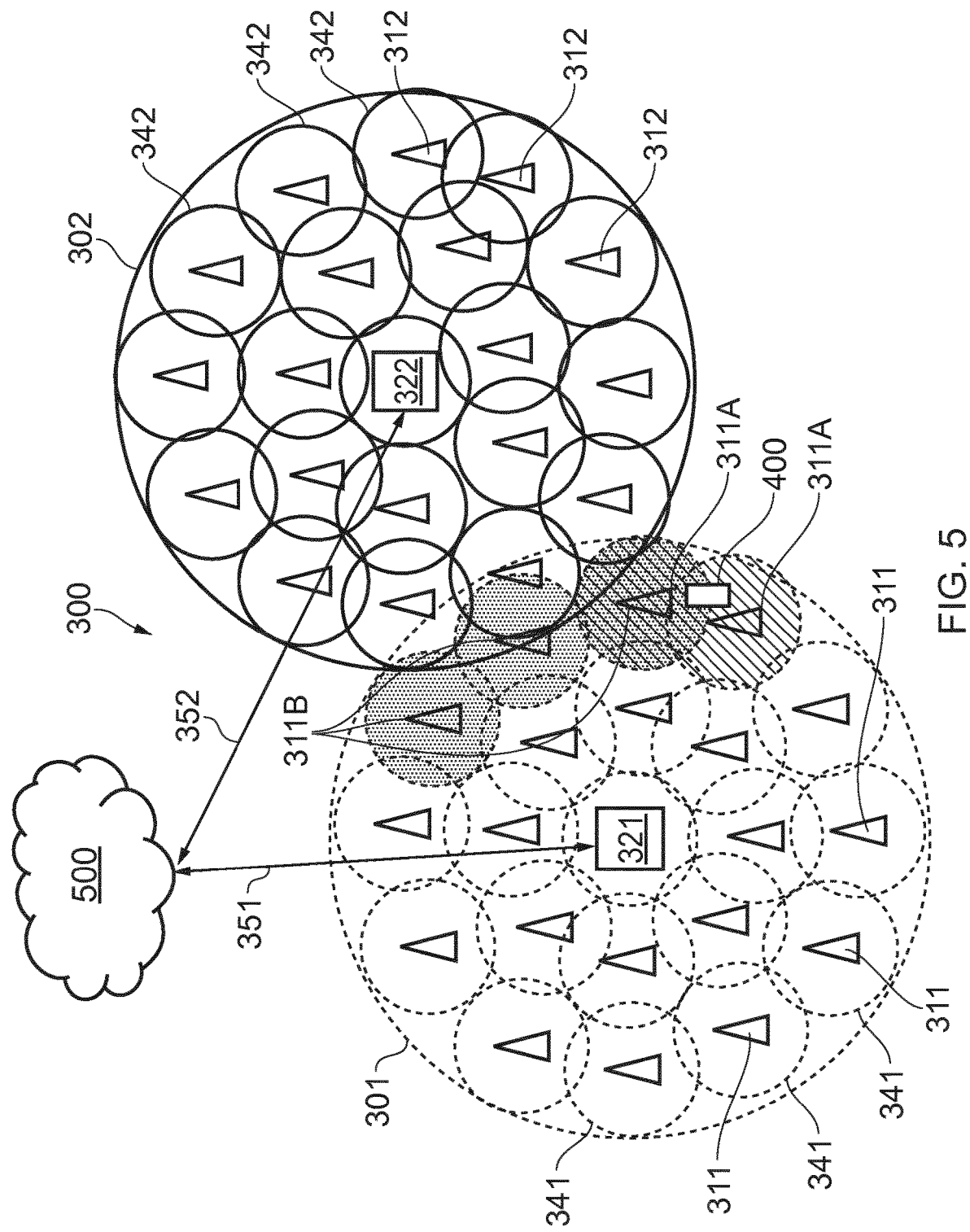
FIG. 5 schematically represents some elements of a wireless telecommunications network/system in accordance with certain embodiments of the disclosure.

FIG. 5 is another schematic representation of the wireless telecommunications system 300 shown in FIG. 2. However, the representation in FIG. 5 differs from the representation in FIG. 2 in generally showing more of the distributed units 311, 312 making up the respective first and second communication cells.

As schematically represented in FIG. 5, a terminal device 400 is located generally towards the edge of the first communication cell. It is assumed the terminal device is communicating with the first controlling node 321 via two of the distributed units 311A as schematically represented in FIG. 5 by cross-hatch shading. These are the subset of the distributed units in the first communication cell that serve the location of the terminal device 400 in the cell. That is to say, the distributed units 311A schematically represented by cross-hatch shading in FIG. 5 are a subset of the distributed units in the first cell which are currently selected as active distributed units for the terminal device based on its location within the cell.

Also schematically represented in FIG. 5 (in this case by solid shading) are three distributed units 311B forming a predefined subset of distributed units. This predefined subset is based on the distributed units in the first communication cell which are located in the vicinity of a boundary region between the first communication cell and the second communication cell. In this regard, the predefined subset may be referred to as comprising cell-edge distributed units. The predefined subset of cell-edge distributed units may be established, for example, during deployment of the network infrastructure. In a simple implementation, the cell-edge distributed units for the first communication cell may be defined by identifying the distributed units in the first communication cell which serve terminal devices in geographic locations which are also served by distributed units located in the second communication cell (and more generally in any other surrounding communication cell).

In accordance with some embodiments of the disclosure, the controlling node 321 compares the currently active distributed unit(s)/TRP(s) 311A for the terminal device with the predefined cell-edge distributed unit(s)/TRP(s) 311B. If one or more of the currently active distributed units is in the predefined subset of cell-edge distributed units (i.e. if there is any overlap in the active subset and cell-edge subset), the controlling node 321 determines that the terminal device 400 is approaching the edge of the cell, and in response initiates/triggers an aspect of the handover evaluation procedure.

Figure 6:
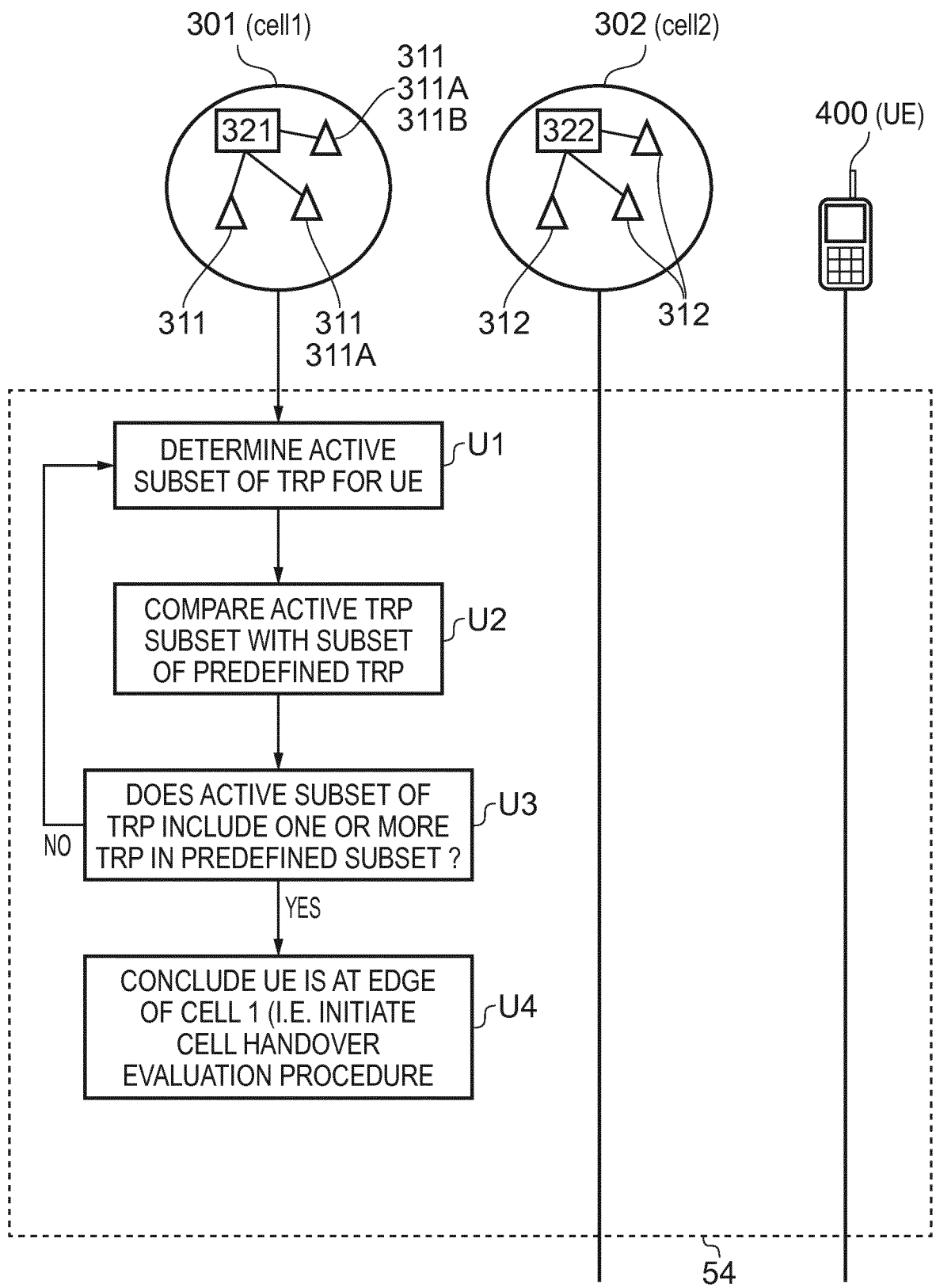
FIGS. 6 and 7 are ladder diagrams schematically representing some operating aspect of wireless telecommunications networks/systems in accordance with certain embodiments of the disclosure.

FIG. 6 is a is a ladder diagram schematically representing sub-steps of step S4 in the ladder diagram of FIG. 2 in accordance with certain embodiments of the disclosure. The steps represented in FIG. 6 thus represent one way in which the controlling node 321 in the first cell 301 may determine a terminal device is approaching the edge of its coverage. That is to say, the steps represented in FIG. 6 represent an approach for determining whether to trigger a handover evaluation procedure in accordance with certain embodiments of the disclosure.

In step U1 the controlling node 321 determines which of the distributed unit(s)/TRPs/intermediate node(s) 311 comprising the first communication cell 301 are currently active for the terminal device. It will be appreciated this step will typically not require the controlling node to newly establish the currently active distributed units from scratch since the controlling node will already be aware of the currently active distributed units for the terminal device by virtue of the fact it is already using them to communicate with the terminal device.

In step U2 the controlling node 321 compares the members of currently active subset of distributed units with a predefined subset of cell-edge distributed units which, as noted above, may be predefined on the basis of their proximity to an edge of the cell.

In step U3, the controlling node 321 determines if there is any overlap in the subset of active distributed units and the subset of pre-defined cell-edge distributed units (i.e. if any of the active distributed units are cell-edge distributed units).

If in step U3 it is determined none of the active distributed units are cell-edge distributed units, it is determined the terminal device is not approaching the edge of coverage for the controlling node 321, and consequently, there is no requirement to initiate an aspect of a handover evaluation procedure. In the example of FIG. 6, it is assumed the processing returns back to step U1 such that the controlling node 321 will in effect reassess whether or not any of the currently-active distributed units are cell-edge distributed units on a repeating basis until it is determined one of the active distributed units is a cell-edge distributed unit, in which case processing will proceed to step U4. It will be appreciated the loop back to step U1 in response to a negative determination in step U3 may include a delay, for example of several seconds or minutes. In another example implementation, instead of regularly repeating steps U1, U2 and U3 in this way, in response to a negative determination in step U3, the processing represented FIG. 6 may halt, and be restarted from step U1 in response to a determined change in the subset of active distributed units for the terminal device. That is to say, the process of determining whether or not the active subset of distributed units for a terminal device includes one or more cell-boundary distributed units may be performed in response to the controlling node determining the terminal device has started using a new distributed unit (for example because it has moved location within the cell), and may not be repeated until there is another change in the subset of active distributed units for the terminal device.

If it is determined in step U3 that one or more of the active distributed units for the terminal device are cell-edge distributed units, processing proceeds to step U4 in which it is concluded the terminal device is located in the vicinity of the edge of coverage for the controlling node 321 and so an aspect of a cell evaluation procedure should be triggered. It will be appreciated the specific aspect of a cell evaluation procedure that is triggered/initiated in response to the processing of FIG. 6 will depend on the application at hand. That is to say, the approach of FIG. 6 is primarily concerned with whether or not to trigger a cell handover evaluation procedure, and not the specific nature of the cell handover evaluation procedure itself. In this example implementation it is assumed the cell handover evaluation procedure is based on the processing set out in FIG. 3, and as such the aspect of the cell handover evaluation procedure that is triggered in response to the determination of the terminal device being located towards an edge of the cell is the processing set out in step S5 of FIG. 3. That is to say, the aspect of the cell handover evaluation procedure that is triggered by conclusion in step U4 is the initiation of the process of establishing configuration settings for the terminal device to transmit uplink beacon signalling detectable in cell 2. It will be appreciated the processing set out in FIG. 6 may also correspond with substeps of step T4 in FIG. 4, in which case the aspect of the cell handover evaluation procedure that is triggered by conclusion in step U4 is the initiation of the process of establishing configuration settings for the terminal device to receive downlink reference signalling for cell 2 (step T5 in FIG. 4).

Figure 7:
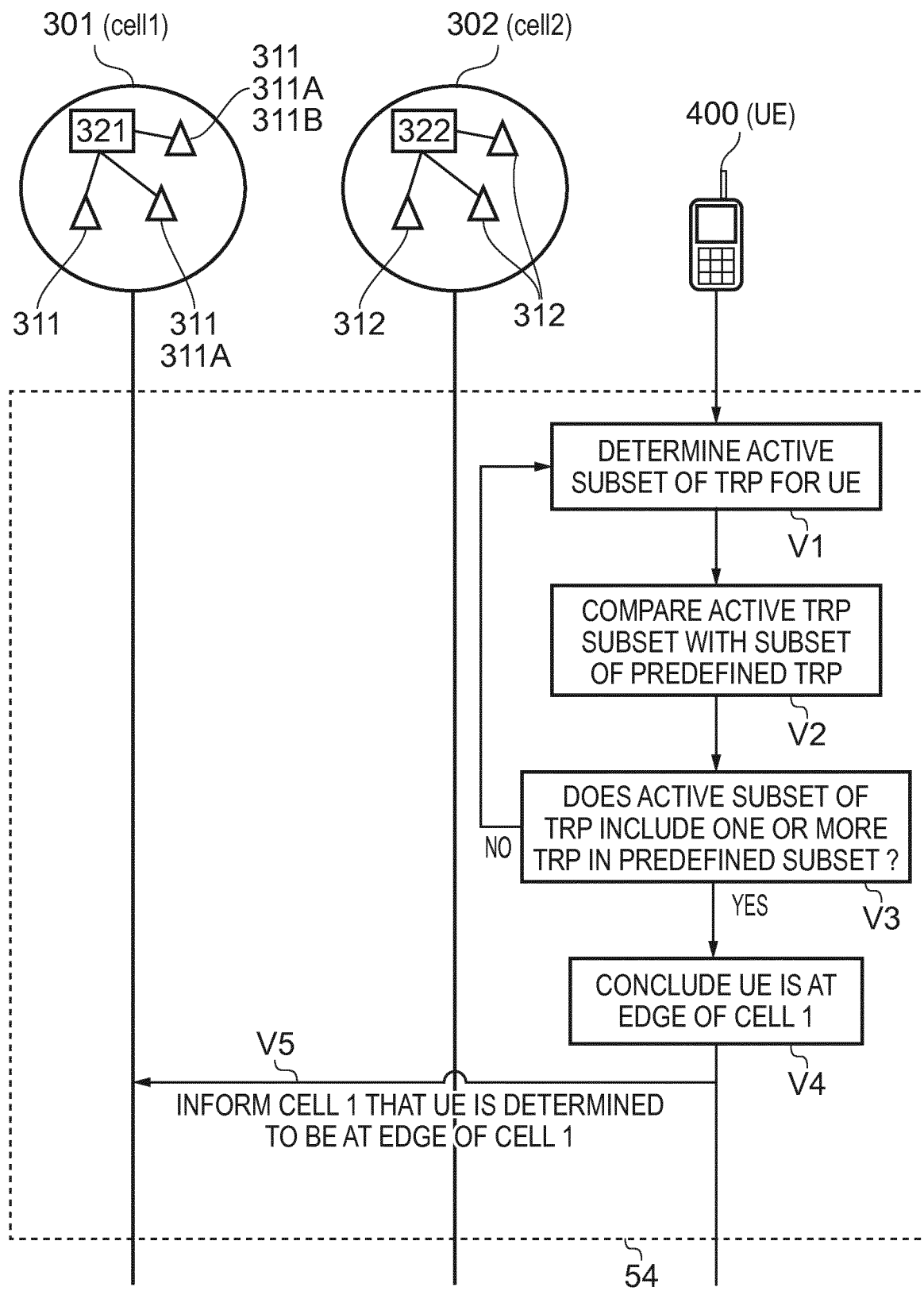

FIG. 7 is a ladder diagram schematically representing sub-steps of step S4 in the ladder diagram of FIG. 2 in accordance with certain other embodiments of the disclosure. This approach differs from the approach of FIG. 6 in that in FIG. 7 the terminal device (rather than the network) determines when the terminal device is located at the edge of the cell and triggers part of a handover evaluation procedure accordingly (in this example by informing the controlling node 321 that the terminal device has determined it is located at the cell edge).

The steps represented in FIG. 7 thus represent another way in which the controlling node 321 in the first cell 301 may determine a terminal device is approaching the edge of its coverage (by being informed of this by the terminal device). That is to say, the steps represented in FIG. 7 represent another approach for determining whether to trigger a handover evaluation procedure in accordance with certain embodiments of the disclosure.

In step V1 the terminal device 400 determines which of the distributed unit(s)/TRPs/intermediate node(s) 311 comprising the first communication cell 301 are currently active for the terminal device. As noted above, in accordance with certain proposed approaches relying on a controlling node responsible for a plurality of distributed units, a terminal device may be unaware of the distributed units through which it is communicating with the controlling node. In these cases the approach of FIG. 7 would not be applicable. However, in some other network configurations a terminal device may be aware of the identities of intermediate nodes through which it is communicating (for example because signalling from the distributed units are associated with identifiers), in which case an approach such as that set out in FIG. 7 may be adopted.

In step V2 the terminal device 400 compares the members of the currently active subset of distributed units with a predefined subset of cell-edge distributed units which, as noted above, may be predefined on the basis of their proximity to an edge of the cell. The distributed units comprising the predefined subset of cell-edge distributed units may, for example, be conveyed to the terminal device in signalling from the controlling node, for example in association with radio resource control signalling during a cell attach procedure.

In step V3, the terminal device 400 determines if there is any overlap in the subset of active distributed units and the subset of pre-defined cell-edge distributed units (i.e. if any of the active distributed units are cell-edge distributed units).

If in step V3 it is determined that none of the active distributed units are cell-edge distributed units, it is determined the terminal device is not approaching the edge of coverage for the controlling node 321, and consequently, there is no requirement to initiate an aspect of a handover evaluation procedure. In the example of FIG. 7, it is assumed the processing returns back to step V1 such that the terminal device 400 will in effect reassess whether or not any of the currently-active distributed units are cell-edge distributed units on a repeating basis until it is determined one or more of its active distributed units is a cell-edge distributed unit, in which case processing will proceed to step V4. It will be appreciated the loop back to step V1 in response to a negative determination in step V3 may include a delay, for example of several seconds or minutes. In another example implementation, instead of regularly repeating steps V1, V2 and V3 in this way, in response to a negative determination in step V3, the processing represented FIG. 7 may halt, and be restarted from step V1 in response to a determined change in the subset of active distributed units for the terminal device. That is to say, the process of determining whether or not the active subset of distributed units for a terminal device includes one or more cell-boundary distributed units may be performed in response to the terminal device determining it has started using a new distributed unit (for example because it has moved location within the cell), and may not be repeated until there is another change in the subset of active distributed units for the terminal device.

If it is determined in step V3 that one or more of the active distributed units for the terminal device are cell-edge distributed units, processing proceeds to step V4 in which it is concluded the terminal device is located in the vicinity of the edge of coverage for the controlling node 321 and so an aspect of a cell evaluation procedure should be triggered. It will be appreciated the specific aspect of a cell evaluation procedure that is triggered/initiated in response to the processing of FIG. 6 will depend on the application at hand. That is to say, as for FIG. 6, the approach of FIG. 7 is primarily concerned with determining whether or not to trigger a cell handover evaluation procedure, and not the specific nature of the cell handover evaluation procedure itself. In this example implementation it is assumed the terminal device is configured to inform the controlling node 321 serving cell 1 when it has determined that it is located in the vicinity of the boundary of cell 1, as schematically indicated in FIG. 7 in step V5.

In this example it is again assumed the cell handover evaluation procedure itself is based on the processing set out in FIG. 3, and as such the controlling node 321 reacts to the signalling received in step V5 by determining the terminal device is at or approaching the edge of its cell coverage, thereby concluding step S4 in FIG. 3. It will again be appreciated the processing set out in FIG. 6 may also correspond with substeps of step T4 in FIG. 4.

It will be appreciated there are various other ways in which an aspect of a handover evaluation procedure for determining whether to hand over a terminal device from a first communication cell to a second communication cell may be triggered in accordance with certain embodiments of the disclosure. For example, steps V1, V2 and V3 represented in FIG. 7 may in effect be condensed into a single step. For example, rather than have the terminal device specifically determine its active subset of distributed units (step V1) and compare these with the predefined cell-edge distributed units (step V2), in another implementation the distributed units in the predefined subset of cell-edge distributed units may be configured to transmit signalling with a characteristic (e.g. a particular scrambling code) which is different from that used for signalling transmitted by other distributed units in the cell. Accordingly, the terminal device can determine that it is located in the coverage area of a cell-edge distributed unit whenever it receives signalling having the associated characteristic.

It will further be appreciated the above identified examples described with reference to FIG. 5 have, for simplicity, focused only on the boundary between two communication cells. In general it may be expected there will be a plurality of communication cells surrounding each communication cell with a corresponding increase in the number of cell-edge distributed units. In these cases an aspect of a handover evaluation procedure may be triggered whenever a terminal device is active on any cell-edge distributed unit. That is to say, with reference to FIG. 5, all of the distributed units adjacent the edge of the first communication cell 301 would be considered to comprise the predefined subset of cell-edge distributed units, and not just those which are adjacent to communication cell 2 and shown with solid shading in FIG. 5. In some cases the cell-edge distributed units may be grouped into subgroups according to the neighbouring cell to which they are adjacent. This can allow the controlling node 321 to determine when the terminal device is in the vicinity of a specific neighbouring cell, and potentially tailor the handover evaluation procedure accordingly (e.g. to configure the terminal device to transmit uplink beacon signalling in a way which conforms to that expected by the relevant neighbouring cell, and potentially for one or more specific distributed units in that cell). That is to say, in some cases the terminal device and/or network infrastructure equipment may determine which part of the cell edge the terminal is located in. For example, if any of the solid-shaded distributed units in FIG. 5 are active for a terminal device, it can be determined the terminal device is in the vicinity of the boundary of the first cell 301 adjacent to the second cell 302. However, if instead it is determined the terminal is located in the vicinity of any of the non-shaded distributed units 311 at the edge of the first cell 301, it may be determined the terminal device is in the vicinity of the boundary of the first cell 301 adjacent to another cell (not shown in FIG. 5).

Thus, to summarise some approaches in accordance with the principle described herein, a method for triggering an aspect of a cell handover evaluation procedure (e.g. initiating a new cell handover evaluation procedure or modifying an ongoing cell handover evaluation procedure), may be in effect based on a location for the terminal device determined according to which TRPs in a cell are active for the terminal device.

In a broad summary, if a terminal device is active on a distributed unit that is located towards the edge of a cell, this may be taken to be an indication that a cell handover evaluation procedure should be initiated/modified. Various implementations of this general approach can be adopted, for example in accordance with the following.

In some cases, the terminal device will be using multiple active distributed units, instead of just one. In one example, the terminal device is triggered to enable downlink measurements/transmit uplink beacons whenever any of those distributed units are actively involved in data transmission/reception with the terminal device. Alternatively the trigger may occur only when a certain combination are active (for example when all, or when at least two, of the solid-shaded cell-edge distributed units in FIG. 5 are active, this may indicate that the terminal device is near the border between cells 1 and 2).

Example uplink beacon signals include:
Sounding reference signals (SRS)
Reference signals transmitted within another channel, e.g. a set of DMRS within a PUCCH or PUSCH channel. This set of reference signals may be transmitted in addition to the set of DMRS used for demodulation in the distributed unit(s) to which the terminal device is transmitting
A separate physical channel There are a number of different options for how to configure and trigger the terminal device measurement/uplink beacon. In one example, the terminal device may be provided with a dedicated configuration (similar to MEASUREMENT CONTROL or RADIO BEARER RECONFIGURATION in an LTE context). In other examples, the distributed units may broadcast an indication either in common system information or provided as part of on-demand system information (or on-demand terminal device measurement/uplink beacon configuration by unicast or groupcast) that triggers a previously stored configuration whenever there are terminal devices in the coverage area of those distributed units close to cell borders. The network may send the complete configuration which should be applied by the terminal device in order to re-write a terminal device's current configuration, or as an alternative, signalling of changes (delta signalling) can be adopted to be applied on top of an existing configuration, e.g. the network only includes the configuration to perform a measurement on new distributed units associated with a second controlling node which is not included in a previous configuration, or configures the terminal device to transmit an uplink signal addressed to a new controlling node (e.g. on another frequency) in addition to the existing uplink signal.

Terminal devices may be configured to perform no or less measurements or send no or less frequent uplink beacon signals unless they enter into the border area (i.e. until they become active on a cell-edge disputed unit). It may be advantageous to include a time-related configuration for the transmission or measurement in order to help allow for time-reuse of the transmissions or measurements of the neighbouring distributed units and help allow neighbouring distributed units to sleep (periodically turn off their receivers) for power saving.

The configuration or indication may include an identifier for use in the uplink signal, or it may include frequency, time and channel code information to be used for transmission or measurement. Different distributed units or distributed unit combinations may provide different configurations (for example for different neighbour cells or report triggering criteria).

The configuration might be provided via an anchor C-plane cell (e.g. LTE cell) and the configuration is enabled either when the terminal device detects that it is in the coverage of those distributed units, or when the network detects that the terminal device is in the coverage of those distributed units it may provide an indication via RRC, MAC (e.g. MAC header), or L1 signalling (e.g. PDCCH order).

In an embodiment, the indication to perform inter-controlling node downlink measurements or inter-controlling node uplink beacon transmission may be done via paging. When the terminal device enters distributed units at the border of two controlling node coverage areas, paging is sent from one or more of these distributed units as a trigger for an aspect of a handover evaluation procedure. This paging could operate in several ways, for example as:

A new DCI that indicates to terminal devices to start inter-controlling node downlink measurements/uplink beacon transmission. Additional information such as the configuration for inter-controlling node measurements can be optionally indicated in System Information.

A paging message that indicates to terminal devices to start inter-controlling node downlink/uplink measurements. This message can additionally be restricted to only specific terminal devices by indicating identifiers associated with the relevant terminal devices in the paging message. Configuration for inter-controlling node downlink measurements/uplink transmission can optionally also be included in this paging message.

A paging message to indicate a System Information (SI) change. It should be noted that the terminal device would typically not monitor the System Information within the same cell. Since the distributed units associated with a controlling node may be treated together as one cell, in order to trigger the terminal device to read SI, paging may be used. This may be used if the SI is used to indicate the start of inter-controlling node downlink/uplink measurements and the SI broadcast in these boundary distributed units would contain additional information for inter-controlling node measurements compared to distributed units not at the boundary, e.g. as delta signalling.

In certain embodiments using the above paging methods to trigger the start of inter-controlling node measurements may be applied only for terminal devices entering the boundary distributed units. For those already active in the boundary distributed units, there is no need to decode such paging. Therefore, in some cases a terminal device that has already been triggered to perform inter-controlling node downlink measurements/uplink transmission can ignore this paging.

As noted above, in some cases the terminal device may be responsible for determining whether or not it is active on a cell-edge distributed unit, and if so trigger an aspect of a handover evaluation procedure (e.g. by informing the network it has determined it is operating at the cell edge, or by autonomously starting uplink beacon signal transmission or downlink reference signal measurements to allow for the measurement of radio conditions associated with communications with a controlling node supporting a neighbouring cell. Thus, in certain embodiments, a terminal device may detect that it is in the coverage area of certain predefined distributed units (or that it is in the coverage area of distributed units for which downlink measurements must be made/uplink beacons must be transmitted) based on signalling from the cell-edge distributed unit itself. E.g.:

The DCI from a distributed unit may indicate the identity of the distributed unit, by including a field that identifies the distributed unit.

The downlink reference signals from the distributed units may be coded to indicate the identity of the distributed unit (e.g. the scrambling sequence applied to the downlink reference signals from a distributed unit may indicate the identity of the distributed unit, or that the distributed unit is a cell-edge/cell-boundary distributed unit). Different distributed units may transmit different downlink reference signals in any event, for example to help allow the terminal device to perform channel estimations on each distributed unit separately.

One or more of the downlink channels from the distributed unit may be scrambled with a code that is a function of the identity of the distributed unit.

In an example embodiment, all distributed units attached to the controlling node may transmit the same common system information and the common system information may identify the characteristics of the downlink measurements/uplink beacon transmissions to be applied for different distributed units. E.g. referring to FIG. 5, the common system information for cell 1 may indicate that:

for those terminal devices communicating via the solid shaded distributed units in cell 1, they should use characteristics relevant for the neighbouring distributed units in cell 2.

for those terminal devices communicating via distributed units that are located at cell-edge positions other than the solid-shaded distributed units, characteristics relevant to distributed units in other neighbouring cells (not shown) may be used.

One consideration for conventional handover evaluation is the link imbalance between uplink and downlink (i.e. the difference in path loss in the uplink and downlink frequencies). In a conventional network arrangement, the event trigger threshold and/or offsets applied to evaluation of downlink measurements typically take this into account. In addition, in order to avoid handover failure thresholds should not be set too low however if the thresholds are set too high then there is a risk of ping-pong due to the terminal device being handed over to a cell too early. In approaches according to certain embodiments of the disclosure, the distributed unit(s) may measure the uplink reference signals from a terminal device and the controlling node may configure the downlink measurement.

In one example, uplink/downlink link imbalance may be taken into account by the controlling node, for example by applying an offset to compensate for the imbalance. Such an offset may be applied to the configured threshold used by the terminal device for triggering reporting of downlink measurements and may be at least partially determined based on measurements taken on the uplink signal, or may be applied to a threshold used by the controlling node to determine whether to initiate a further mobility procedure. The controlling node may determine the value of the offset based at least partially on the distributed units that are serving the relevant terminal device. For example if the terminal device is being served by any of the solid-shaded distributed units 311B in FIG. 5, then a first offset may applied, but if the UE is not being served by any of the solid-shaded distributed units in FIG. 5, then a second offset may be applied.

In another example, the controlling node may be configured to disable or enable an aspect of the procedures to account for uplink/downlink link imbalance based on which distributed units are serving the relevant terminal device. For example, if the terminal device is being served by one of the solid-shaded distributed units 311B in FIG. 5, then the controlling node may enable use of downlink reference signals in the procedure, whereas if the terminal device is not being served by any of the solid-shaded distributed units in FIG. 5, then the controlling node may disable use of downlink reference signals in the procedure.

In some implementations of an architecture of the kind presented in FIG. 5, distributed units under the control of a controlling node may be turned off when they are not needed to support communications, for power saving. In such implementations, in accordance with certain embodiments, when a terminal device is determined to be within the coverage area of a distributed unit at the edge of the cell (e.g. one of the solid-shaded distributed units shown in FIG. 5), the controlling node serving that cell may send a message to the controlling node serving a neighbouring cell. This message may indicate the distributed units at the adjoining edge of the neighbouring controlling node that should be turned on. Then, if the distributed units in the neighbouring cell have been switched off, the neighbouring controlling node may turn the relevant distributed units on so they can start transmitting synchronisation and/or reference signals or start listening for uplink beacon signals (according to the operation of the handover evaluation procedure at hand).

While certain example embodiments have been described in relation to particular example network architectures, it will be appreciated the same principles can be applied in respect of other network architectures. For example, in the network 300 schematically represented in FIG. 2, the coverage area of a cell is in effect defined by the aggregated coverage areas of the distributed units making up the cell, and each cell is individually associated with/hosted by a controlling node. That is to say, in the example of FIG. 2, there is a one-to-one mapping between controlling nodes and communication cells. However, in another example, a single controlling node may be responsible for/host more than one cell (i.e. more than one group of distributed units). In that regard, it may be noted the first communication cell and the second communication cell may be associated with the same network infrastructure element. That is to say, in some scenarios the first network infrastructure element associated with a first communication cell and the second network infrastructure element associated with a second communication cell may be the same network infrastructure element (i.e. a single network infrastructure element associated with (in the sense of hosting/controlling) two (or more) different cells.

Thus there has been described a method for triggering an aspect of a handover evaluation procedure in a wireless telecommunications system for determining whether to handover a terminal device from communicating with a first network infrastructure element associated with a first communication cell to communicating with a second network infrastructure element associated with a second communication cell, wherein the first communication cell comprises a group of intermediate nodes distributed through the first communication cell and wherein communications between the first network infrastructure element and the terminal device are made through a subset of the intermediate nodes comprising one or more of the intermediate nodes selected as active intermediate nodes for the terminal device based on a location of the terminal device within the cell, and wherein the method comprises: determining if the subset of active intermediate nodes for the terminal device includes one or more predefined intermediate nodes; and if so initiating an aspect of the handover evaluation procedure.

Approaches in accordance with implementations of the disclosure thus can help provide a relatively simple method for determining when a terminal device is located at a border area between cells without necessarily relying on measurement evaluation, which may vary depending on channel conditions.

It will be appreciated the approaches described herein for determining whether or not to trigger a handover evaluation procedure may be applied regardless of the nature of the handover evaluation procedure itself (i.e. approaches for determining whether to initiate a handover evaluation procedure in accordance with embodiments of the disclosure are not limited to the handover evaluation procedure example set out above). Similarly, it will be appreciated the handover evaluation procedures described herein may be applied regardless of the method for determining whether or not to trigger a handover evaluation procedure (i.e. approaches for handover evaluation in accordance with embodiments of the disclosure are not limited to the example methods for triggering handover evaluation set out above).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for triggering part of a handover evaluation procedure for determining whether to handover a terminal device from communicating with a first network infrastructure element associated with a first communication cell to communicating with a second network infrastructure element associated with a second communication cell in a wireless telecommunications system, wherein the first communication cell comprises a group of intermediate nodes distributed through the first communication cell, wherein communications between the first network infrastructure element and the terminal device are made via a subset of the intermediate nodes, the subset comprising one or more of the intermediate nodes selected as active intermediate nodes for the terminal device based on a location of the terminal device within the first communication cell, and wherein the method comprises: determining if the subset of active intermediate nodes for the terminal device includes one or more intermediate nodes in a predefined subset of intermediate nodes, and if so initiating the part of the handover evaluation procedure.

Paragraph 2. The method of paragraph 1, wherein the predefined subset of intermediate nodes comprises intermediate nodes located towards a boundary region between the first communication cell and the second communication cell.

Paragraph 3. The method of paragraph 1 or 2, wherein the steps of determining if the subset of active intermediate nodes for the terminal device includes one or more predefined intermediate nodes and if so initiating the part of the handover evaluation procedure are performed by the first network infrastructure element.

Paragraph 4. The method of paragraph 1 or 2, wherein the steps of determining if the subset of active intermediate nodes for the terminal device includes one or more predefined intermediate nodes and if so initiating the part of the handover evaluation procedure are performed by the terminal device.

Paragraph 5. The method of paragraph 4, wherein initiating the part of the handover evaluation procedure comprises the terminal device conveying an indication to the first network infrastructure element to indicate the terminal device has determined the subset of active intermediate nodes for the terminal device includes one or more of the predefined intermediate nodes.

Paragraph 6. The method of any preceding paragraph, wherein initiating the part of the handover evaluation procedure comprises configuring the terminal device to transmit uplink reference signalling or receive downlink reference signalling for use in establishing a measurement of radio conditions associated with a communication path between the terminal device and the second network infrastructure element.

Paragraph 7. The method of paragraph 6, wherein the terminal device is configured to transmit uplink reference signalling or receive downlink reference signalling in response to initiation signalling received from the first network infrastructure element.

Paragraph 8. The method of paragraph 7, wherein the initiation signalling is received by the terminal device in association with a paging message from the first network infrastructure element.

Paragraph 9. The method of any of paragraphs 6 to 8, wherein the terminal device is configured to transmit uplink reference signalling or receive downlink reference signalling in a format determined by configuration information received from the first network infrastructure element.

Paragraph 10. The method of any preceding paragraph, wherein the handover evaluation procedure comprises comparing measurements of radio conditions associated with communication paths between the terminal device and respective ones of the first and second network infrastructure elements, and wherein initiating the part of the handover evaluation procedure comprises initiating the measurement and comparison of radio conditions or initiating the measurement and comparison of radio conditions at an increased rate.

Paragraph 11. The method of any preceding paragraph, wherein the second communication cell comprises a group of intermediate nodes distributed through the second communication cell for supporting communications with the second network infrastructure element in the second communication cell, and wherein the method further comprises the first network infrastructure element conveying an indication to the second network infrastructure element to cause the second network infrastructure element to activate any of a predefined subset of the intermediate nodes distributed through the second communication cell which are not already activated in response to determining the subset of active intermediate nodes for the terminal device includes one or more intermediate nodes in the predefined subset of intermediate nodes distributed through the first communication cell.

Paragraph 12. The method of paragraph 11, wherein the predefined subset of intermediate nodes distributed through the second communication cell comprises intermediate nodes located towards a boundary region between the second communication cell and the first communication cell.

Paragraph 13. A method of operating a first network infrastructure element associated with a first communication cell in a wireless telecommunications system to determine whether to trigger part of a handover evaluation procedure for determining whether to handover a terminal device from communicating with the first network infrastructure element to communicating with a second network infrastructure element associated with a second communication cell in the wireless telecommunications system, wherein the first communication cell comprises a group of intermediate nodes distributed through the first communication cell, wherein communications between the first network infrastructure element and the terminal device are made via a subset of the intermediate nodes, the subset comprising one or more of the intermediate nodes selected as active intermediate nodes for the terminal device based on a location of the terminal device within the first communication cell, and wherein the method comprises: the first network infrastructure element determining if the subset of active intermediate nodes for the terminal device includes one or more intermediate nodes in a predefined subset of intermediate nodes, and if so initiating the part of the handover evaluation procedure.

Paragraph 14. A first network infrastructure element associated with a first communication cell in a wireless telecommunications system comprising the first network infrastructure element, a second network infrastructure element associated with a second communication cell, and a terminal device, wherein the first communication cell comprises a group of intermediate nodes distributed through the first communication cell and wherein the first network infrastructure element is configured to communicate with the terminal device via a subset of the intermediate nodes, the subset comprising one or more of the intermediate nodes selected as active intermediate nodes for the terminal device based on a location of the terminal device within the first communication cell, wherein the first network infrastructure element comprises a controller unit and a transceiver unit configured such that the first network infrastructure element is operable to determine if the subset of active intermediate nodes for the terminal device includes one or more intermediate nodes in a predefined subset of intermediate nodes, and if so initiate part of a handover evaluation procedure for determining whether to handover the terminal device from communicating with the first network infrastructure element to communicating with the second network infrastructure element.

Paragraph 15. Integrated circuitry for a first network infrastructure element associated with a first communication cell in a wireless telecommunications system comprising the first network infrastructure element, a second network infrastructure element associated with a second communication cell, and a terminal device, wherein the first communication cell comprises a group of intermediate nodes distributed through the first communication cell and wherein the first network infrastructure element is configured to communicate with the terminal device via a subset of the intermediate nodes, the subset comprising one or more of the intermediate nodes selected as active intermediate nodes for the terminal device based on a location of the terminal device within the first communication cell, wherein the integrated circuitry comprises a controller element and a transceiver element configured to operate such that the first network infrastructure element is operable to determine if the subset of active intermediate nodes for the terminal device includes one or more intermediate nodes in a predefined subset of intermediate nodes, and if so initiate part of a handover evaluation procedure for determining whether to handover the terminal device from communicating with the first network infrastructure element to communicating with the second network infrastructure element.

Paragraph 16. A method of operating a terminal device in a wireless telecommunications system to determine whether to trigger part of a handover evaluation procedure for determining whether to handover the terminal device from communicating with a first network infrastructure element associated with a first communication cell in the wireless telecommunications network to communicating with a second network infrastructure element associated with a second communication cell in the wireless telecommunications system, wherein the first communication cell comprises a group of intermediate nodes distributed through the first communication cell, wherein communications between the first network infrastructure element and the terminal device are made via a subset of the intermediate nodes, the subset comprising one or more of the intermediate nodes selected as active intermediate nodes for the terminal device based on a location of the terminal device within the first communication cell, and wherein the method comprises: the terminal device determining if the subset of active intermediate nodes for the terminal device includes one or more intermediate nodes in a predefined subset of intermediate nodes, and if so initiating the part of the handover evaluation procedure.

Paragraph 17. A terminal device for use in a wireless telecommunications system comprising the terminal device, a first network infrastructure element associated with a first communication cell and a second network infrastructure element associated with a second communication cell, wherein the first communication cell comprises a group of intermediate nodes distributed through the first communication cell and wherein the terminal device is configured to communicate with the first network infrastructure via a subset of the intermediate nodes, the subset comprising one or more of the intermediate nodes selected as active intermediate nodes for the terminal device based on a location of the terminal device within the first communication cell, wherein the terminal device comprises a controller unit and a transceiver unit configured such that the terminal device is operable to determine if the subset of active intermediate nodes for the terminal device includes one or more intermediate nodes in a predefined subset of intermediate nodes, and if so initiate part of a handover evaluation procedure for determining whether to handover the terminal device from communicating with the first network infrastructure element to communicating with the second network infrastructure element.

Paragraph 18. Integrated circuitry for a terminal device for use in a wireless telecommunications system comprising the terminal device, a first network infrastructure element associated with a first communication cell and a second network infrastructure element associated with a second communication cell, wherein the first communication cell comprises a group of intermediate nodes distributed through the first communication cell and wherein the terminal device is configured to communicate with the first network infrastructure via a subset of the intermediate nodes, the subset comprising one or more of the intermediate nodes selected as active intermediate nodes for the terminal device based on a location of the terminal device within the first communication cell, wherein the integrated circuitry comprises a controller element and a transceiver element configured to operate such that the first network infrastructure element is operable to determine if the subset of active intermediate nodes for the terminal device includes one or more intermediate nodes in a predefined subset of intermediate nodes, and if so initiate part of a handover evaluation procedure for determining whether to handover the terminal device from communicating with the first network infrastructure element to communicating with the second network infrastructure element.

REFERENCES

[1] Holma H. and Toskala A, "LTE for UMTS OFDMA and SC-FDMA based radio access", John Wiley and Sons, 2009

The invention claimed is:

1. A method for triggering part of a handover evaluation procedure for determining whether to handover a terminal device from communicating with first network infrastructure element associated with a first communication cell to communicating with a second network infrastructure element associated with a second communication cell in a wireless telecommunications system, wherein the first communication cell comprises a group of intermediate nodes distributed through the first communication cell, communications between the first network infrastructure element and the terminal device are made via a subset of the intermediate nodes, and the subset comprising one or more of the intermediate nodes selected as active intermediate nodes for the terminal device based on a location of the terminal device within the first communication cell, the method comprising:
  determining whether the subset of intermediate nodes for the terminal device includes one or more intermediate nodes within a boundary region of the first communication cell and that overlaps the second communication cell based on a predefined information identifying intermediate nodes within the boundary region; and
  in a case that the determining indicates that the subset of intermediate nodes includes the one or more intermediate nodes within the boundary region, initiating the part of the handover evaluation procedure.

2. The method of claim 1, wherein the determining and the initiating are performed by the first network infrastructure element.

3. The method of claim 1, wherein the determining and the initiating are performed by the terminal device.

4. The method of claim 3, wherein the initiating the part of the handover evaluation procedure comprises the terminal device conveying an indication, to the first network infrastructure element, to indicate that the terminal device has determined that the subset of intermediate nodes for the terminal device includes the one or more of the intermediate nodes within the boundary region.

5. The method of claim 1, wherein the initiating the part of the handover evaluation procedure comprises configuring the terminal device to transmit uplink reference signalling or to receive downlink reference signalling for use in establishing a measurement of radio conditions associated with a communication path between the terminal device and the second network infrastructure element.

6. The method of claim 5, wherein the terminal device is configured to transmit uplink reference signalling or to receive downlink reference signalling in response to initiation signalling received from the first network infrastructure element.

7. The method of claim 6, wherein the initiation signalling is received by the terminal device in association with a paging message from the first network infrastructure element.

8. The method of claim 5, wherein the terminal device is configured to transmit uplink reference signalling or to receive downlink reference signalling in a format according to configuration information received from the first network infrastructure element.

9. The method of claim 1, wherein
  the handover evaluation procedure comprises comparing measurements of radio conditions associated with communication paths between the terminal device and respective ones of the first and second network infrastructure elements, and
  the initiating the part of the handover evaluation procedure comprises initiating measurement and comparison of radio conditions or initiating the measurement and comparison of radio conditions at an increased rate.

10. The method of claim 1, wherein
  the second communication cell comprises a group of intermediate nodes distributed through the second communication cell for supporting communications with the second network infrastructure element in the second communication cell, and
  the method further comprises the first network infrastructure element conveying an indication to the second network infrastructure element to cause the second network infrastructure element to activate any of a predefined subset of the intermediate nodes distributed through the second communication cell which are not already activated in response to determining that the subset of active intermediate nodes for the terminal device includes one or more intermediate nodes in the predefined subset of intermediate nodes distributed through the first communication cell.

11. A method of operating a terminal device in a wireless telecommunications system to determine whether to trigger part of a handover evaluation procedure for determining whether to handover the terminal device from communicating with a first network infrastructure element associated with a first communication cell in the wireless telecommunications network to communicating with a second network infrastructure element associated with a second communication cell in the wireless telecommunications system, wherein the first communication cell comprises a group of intermediate nodes distributed through the first communication cell, communications between the first network infrastructure element and the terminal device are made via a subset of the intermediate nodes, and the subset comprising one or more of the intermediate nodes selected as active intermediate nodes for the terminal device based on a location of the terminal device within the first communication cell, the method comprising:
  determining, by the terminal device, whether the subset of intermediate nodes for the terminal device includes one or more intermediate nodes within a boundary region of the first communication cell and that overlaps the second communication cell based on a predefined information identifying intermediate nodes within the boundary region; and
  in a case that the determining indicates that the subset of intermediate nodes includes the one or more intermediate nodes within the boundary region, initiating the part of the handover evaluation procedure.

12. A terminal device for use in a wireless telecommunications system comprising the terminal device, a first network infrastructure element associated with a first communication cell and a second network infrastructure element associated with a second communication cell, wherein the first communication cell comprises a group of intermediate nodes distributed through the first communication cell, the terminal device is configured to communicate with the first network infrastructure via a subset of the intermediate nodes, and the subset comprising one or more of the intermediate nodes selected as active intermediate nodes for the terminal device based on a location of the terminal device within the first communication cell, the terminal device comprising:
  a transceiver; and
  control circuitry configured to:
    determine whether the subset of intermediate nodes for the terminal device includes one or more intermediate nodes within a boundary region of the first communication cell and that overlaps the second communication cell based on a predefined information identifying intermediate nodes within the boundary region; and
    in a case that the control circuitry determines that the subset of intermediate nodes includes the one or more intermediate nodes within the boundary region, initiate part of a handover evaluation procedure for determining whether to handover the terminal device from communicating with the first network infrastructure element to communicating with the second network infrastructure element.

\* \* \* \* \*